United States Patent

Hayashi

[11] Patent Number: 5,957,828
[45] Date of Patent: Sep. 28, 1999

[54] SILVER SOL, PREPARATION THEREOF, COATING MATERIAL FOR FORMING TRANSPARENT CONDUCTIVE FILM AND TRANSPARENT CONDUCTIVE FILM

[75] Inventor: Takao Hayashi, Yamaguchi, Japan

[73] Assignee: Mitsui Mining and Smelting Co., Ltd., Tokyo, Japan

[21] Appl. No.: 09/073,846

[22] Filed: May 7, 1998

Related U.S. Application Data

[62] Division of application No. 08/795,138, Feb. 7, 1997, abandoned.

[30] Foreign Application Priority Data

Aug. 28, 1996 [JP] Japan ................................. 8-227002

[51] Int. Cl.$^6$ ............................ C09K 3/00; B01F 17/00; B05B 3/10; C22C 5/06
[52] U.S. Cl. ............................ 516/88; 516/32; 516/77; 516/97; 516/928; 106/1.19; 420/501
[58] Field of Search ................................. 252/313.1, 309, 252/314, 514; 106/1.19; 420/501; 516/97, 928

[56] References Cited

U.S. PATENT DOCUMENTS

| | | | |
|---|---|---|---|
| 2,752,237 | 6/1956 | Short et al. | 75/118 |
| 3,201,223 | 8/1965 | Cuhra et al. | 75/5 |
| 3,345,158 | 10/1967 | Block et al. | 75/108 |
| 4,552,691 | 11/1985 | Shoji et al. | 252/514 |
| 4,979,985 | 12/1990 | Tosun et al. | 75/370 |
| 5,294,370 | 3/1994 | Wichers et al. | 252/313.1 |

FOREIGN PATENT DOCUMENTS

| | | |
|---|---|---|
| 4-027424 | 1/1992 | Japan . |
| 4-027425 | 1/1992 | Japan . |
| 6-218273 | 8/1994 | Japan . |

OTHER PUBLICATIONS

Oppenheimer, "Characterization of Gold & Silver Sol by Sedimentation Field–Flow Fractionation", Langmuir, 1988, vol. 4, pp. 144–147.

Tohno, "Production of highly concentrated nanophase silver . . . ", J. Aerosol Sci., 1993, vol. 24, No. 3, pp. 339–347.

*Primary Examiner*—C. H. Kelly
*Assistant Examiner*—Monique T. Cole
*Attorney, Agent, or Firm*—Young & Thompson

[57] ABSTRACT

A silver sol comprises silver particles having a particle size ranging from 1 to 100 nm and a silver solid content ranging from 1 to 80% by weight. The silver sol can be prepared by a method comprising the steps of reacting a solution of a silver compound with a reducing agent at a temperature ranging from 5 to 50° C. and a stirring speed falling within the range of from 1,000 to 10,000 rpm to form silver fine particles; recovering the resulting silver fine particles using a centrifugal separator; and then dispersing the silver fine particles in a medium to give a silver sol having a silver solid content ranging from 1 to 80% by weight. The silver sol or a coating material obtained by diluting the sol to a desired silver solid content and, if desired, adding a binder permits the formation of a transparent conductive film on, for instance, a cathode-ray tube while reducing the production cost. The resulting transparent conductive film has high transparency suitably used for coating a cathode-ray tube, excellent conductivity, in particular, good electromagnetic shielding properties and a surface resistance of not more than $10^3$ Ω/□.

6 Claims, No Drawings

SILVER SOL, PREPARATION THEREOF, COATING MATERIAL FOR FORMING TRANSPARENT CONDUCTIVE FILM AND TRANSPARENT CONDUCTIVE FILM

CROSS-REFERENCE TO RELATED APPLICATIONS

This application is a division of application Ser. No. 08/795,138, filed Feb. 7, 1997, now abandoned.

BACKGROUND OF THE INVENTION (a) Field of the Invention

The present invention relates to a silver sol excellent in storage stability, a method for preparing the same, a coating material for forming a transparent conductive film and a transparent conductive film formed from the coating material and more particularly to a transparent conductive film which has high transparency and is excellent in electrical conductivity and, in particular, electromagnetic shielding properties as well as a silver sol used for preparing the transparent conductive film, a method for preparing the same and a coating material for forming the film.

(b) Description of the Prior Art

Cathode-ray tubes including those used in televisions and used as a means for computer display have conventionally been required to have high resolution and good antistatic properties. However, they have recently been required to also show excellent electromagnetic shielding properties in addition to the foregoing requirements. For instance, the magnitude of the voltage applied to the cathode-ray tube is increasingly high as the size of the tube increases. This in turn leads to the generation of a high voltage-static electricity and accordingly, the picture plane becomes whitish due to dusts adhered to the surface of the tube through electrostatic attraction. In case of computer display, an operator manipulates a computer at a position in the proximity to the surface of the cathode-ray tube and accordingly, it has been feared that the health of the operator may be adversely affected by the static electricity and electromagnetic waves generated by the cathode-ray tube.

Rules concerning the electromagnetic shielding properties of the cathode-ray tube have gradually been set in various countries. Accordingly, there has conventionally been used, as a means for achieving electromagnetic shielding, a method for forming a transparent conductive film on the cathode-ray tube surface. An example of such transparent conductive film-forming methods comprises applying a transparent conductive film such as indium tin oxide (ITO) or antimony-doped tin oxide (ATO) onto the cathode-ray tube surface according to, for instance, a sputtering or vapor deposition technique.

However, the ITO films formed by such vapor deposition and sputtering methods necessarily lead to an increase in cost since the formation thereof requires the use of quite expensive film-forming installations and these methods do not permit mass production. For this reason, there has been a strong demand for the development of a novel transparent conductive film as well as a process for forming the same, which permits the reduction of the production cost and mass production of the film.

On the other hand, there have been established various specifications for the electromagnetic shielding properties of cathode-ray tubes, for instance, TCO (Tianstemanners Central Organisation) Guide Lines established by Swedish Central Labor's Society. According to these guide lines, the cathode-ray tube should have a leaked field strength of not more than 1.0 V/m. To satisfy this requirement, the surface resistance of the conductive film should be reduced to a level of not more than $1 \times 10^3$ Ω/□.

Under such circumstances, there have widely been used sol-gel methods since they permit the reduction of its production cost and the formation of conductive films having a low surface resistance.

The sol-gel technique is quite effective since the technique permits uniform coating of the whole surface of a large-sized substrate at a relatively low cost and it can impart, to the resulting coating film, functions of controlling optical and electromagnetic characteristic properties thereof. In this method, a solution of a metal alkoxide in an alcohol is subjected to hydrolysis and poly-condensation at a low temperature in the presence of water and an acidic catalyst to give a sol. The metal alkoxide: $M(OR)_n$ carries an alkoxyl group (—OR) having strong electronegativity and an M—O bond having a high polarity. Therefore, M is susceptible to nucleophilic attack, is quite reactive and easily undergoes a reaction (hydrolysis) with $H_2O$. After the hydrolysis, the compound subsequently undergoes a poly-condensation reaction which is accompanied by a dehydration reaction and de-alcohol reaction.

Hydrolysis:

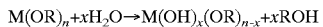

Polycondensation:
Dehydration Reaction:

De-alcohol Reaction:

The resulting sol further undergoes polymerization when applied onto the surface of a substrate by, for instance, a dip coating, spin coating or spray coating method and then heated to thus form a gelled metal oxide film. In general, a solution of tetraethoxysilane (TEOS: $Si(C_2H_5O)_4$) as a metal alkoxide in ethanol as a solvent is subjected to hydrolysis and then poly-condensation in the presence of water and HCl or $HNO_3$ as an acidic catalyst to give such a sol. The coating properties of the sol may be controlled by adjusting, for instance, the sol concentration and the rate of evaporation through addition of, for instance, a high boiling point solvent to the coating solution, i.e., the sol. After the application of the sol, the coated film is heated to a temperature of not less than 180° C. to form a silicon oxide film.

The conductivity of the silicon oxide film carrying silanol groups formed by the sol-gel technique is originated from ionic conduction through hydronium ions formed from water molecules adsorbed on the silanol groups and therefore, the surface resistivity thereof is quite susceptible to moisture. To eliminate such a problem, there has been proposed a method in which a hygroscopic salt is incorporated in the film, but such a film would be insufficient in the stability, with time, (or durability) of the antistatic effect because of the conversion of silanol groups into siloxane groups.

To solve the foregoing problem, there has been proposed a technique in which conductive fine particles of antimony-doped tin oxide (ATO: Antimony Tin Oxide) having a diameter of about 10 nm are dispersed in a sol of a metal alkoxide to thus form a tin oxide film contaminated with ATO. This film can ensure a stable or long-lasting antistatic effect due to the electron conduction of ATO. Alternatively, conductive fine particles of ITO are sometimes used in place of ATO in order to obtain a film having a lower resistance.

However, even a conductive film formed by this method still has a high surface resistance on the order of more than $10^3$ Ω/□ and is still insufficient in the electromagnetic shielding effect. The reason why this method cannot provide a film having a reduced surface resistance would be as follows. ATO consists of fine particles of a metal oxide, it is applied onto the surface of a cathode-ray tube and then heated to form a film for electromagnetic shielding. However, the cathode-ray tube is sensitive to temperature and accordingly, the coated film cannot be heated at an unreasonably high temperature. For this reason, such a film is in general heated at a temperature on the order of about 150° C. The metal oxide fine particles do not cause any sintering therebetween at that temperature. Therefore, the conductivity of the resulting film simply relies on the contact between particles and this would not permit any reduction in the surface resistance.

Contrary to this, fine particles are sintered in the film formed by the sputtering technique and thus the sputtering technique permits the reduction of the surface resistivity to a level of not more than $10^3$ Ω/□, but the resulting film is quite expensive as has been described above and has not yet been put to practical use.

SUMMARY OF THE INVENTION

Accordingly, an object of the present invention is to provide a transparent conductive film which has high transparency suitable for use in making a cathode-ray tube, excellent conductivity, in particular, excellent electromagnetic shielding effect, a low surface resistivity, more specifically, a surface resistivity of not more than $10^3$ Ω/□, and which can be mass-produced while simultaneously reducing the production cost.

Another object of the present invention is to provide a silver sol used for preparing the foregoing transparent conductive film and a coating material for forming such a transparent conductive film.

Still another object of the present invention is to provide a method for preparing such a silver sol, which permits mass production thereof at a low cost.

Other objects and features of the present invention will be apparent from the following description.

The inventors of this invention have conducted various investigations of coating materials for forming transparent conductive films, have found out that fine particles of silver have a large surface area per unit weight and undergo a sintering reaction at a temperature on the order of 150° C., that $Ag_2O$ possibly formed by partial oxidation of a coating material containing silver fine particles for forming a transparent conductive film when the material comes in contact with air during, for instance, application thereof to the substrate surface is also decomposed into Ag ($Ag_2O \rightarrow 2Ag + 1/2O_2$) at a temperature of about 150° C., that a specific method permits the production of a silver sol which has never been obtained conventionally and which is excellent in storage stability even at a high solid silver content and that the foregoing objects of the present invention can effectively be accomplished if such a sol containing silver fine particles exhibiting the foregoing characteristic properties is used as such a coating material for forming a transparent conductive film and thus have completed the present invention.

According to an aspect of the present invention, there is provided a silver sol excellent in storage stability, in which silver particles have a particle size ranging from 1 to 100 nm and which has a silver solid content ranging from 1 to 80% by weight. Preferably, the silver sol has a silver particle size distribution such that the packing density of silver particles ranges from 5 to 8 g/cm³.

According to another aspect of the present invention, there is provided a method for preparing a silver sol which comprises the steps of reacting a solution of a silver compound with a reducing agent, for instance, a silver nitrate solution with a ferrous citrate solution, at a temperature ranging from 5 to 50° C. and a stirring speed falling within the range of from 1,000 to 10,000 rpm to form silver fine particles, or reacting them while, if desired, the reaction temperature or the stirring speed is changed at least one time in the course of the reaction to thus form a mixture of silver fine particles having different particle sizes, the mixture having such a particle size distribution that the packing density of the silver particles ranges from 5 to 8 g/cm³; recovering the resulting silver fine particles using a centrifugal separator; and then dispersing the silver fine particles in a medium to give a silver sol having a silver solid content ranging from 1 to 80% by weight.

According to a still another aspect of the present invention, there is provided a method for preparing a silver sol which comprises the steps of reacting a solution of a silver compound with a reducing agent at a temperature ranging from 5 to 50° C. and a stirring speed falling within the range of from 1,000 to 10,000 rpm to form silver fine particles and then recovering the fine particles using a centrifugal separator, repeating these steps over desired times to obtain silver fine particles having different particle sizes; then mixing these silver fine particles having different particle sizes so that the packing density of the resulting mixture ranges from 5 to 8 g/cm³; and dispersing the silver fine particle mixture in a medium to give a silver sol having a silver solid content ranging from 1 to 80% by weight.

According to a further aspect of the present invention, there is provided a coating material for forming a transparent conductive film excellent in storage stability, which comprises a silver sol. In the silver sol, the particle size of silver particles ranges from 1 to 100 nm and the sol has a silver solid content ranging from 1 to 10% by weight. Preferably, the coating material comprises a silver sol which has a silver particle size distribution such that the packing density of silver particles ranges from 5 to 8 g/cm³, or it comprises the silver sol and a binder.

The binder-containing coating material for forming a transparent conductive film according to the present invention can be obtained by adjusting, if necessary, the silver solid content in the foregoing silver sol to the range of from 1 to 10% by weight and then admixing the resulting silver sol with a binder.

The transparent conductive film according to the present invention is formed by applying either of the foregoing coating materials for forming transparent conductive films to the surface of a substrate such as a cathode-ray tube to give a film and then firing and heating the resulting film.

DESCRIPTION OF THE PREFERRED EMBODIMENTS

The particle size of the silver particles present in the silver sol according to the present invention ranges from 1 to 100 nm and preferably 1 to 50 nm. Although a good transparent conductive film can be formed using silver fine particles having a particle size of less than 1 nm, the production of such very fine silver particles is not practical since the production thereof is quite difficult from the technical standpoint and results in an increase in cost. On the other hand, if using silver fine particles having a particle size of more than 100 nm, the resulting conductive film has a reduced conductivity because of a low packing density thereof. Moreover, the thickness of the resulting film increases and this leads to a reduction in the light transmission properties and therefore, it becomes difficult to ensure a desired light transmittance (not less than 80%) of the resulting film.

The silver sol according to the present invention is excellent in storage stability, although the sol has a high silver solid content falling within the range of from 1 to 80% by weight. There has not yet been developed such a silver sol simultaneously having such a high silver solid content and excellent storage stability. If the silver solid content in the silver sol is less than 1% by weight, the solid content in the coating material for forming transparent conductive films, which is prepared using such a silver sol, is necessarily less than 1% by weight. The silver fine particles in the film obtained by applying such a coating material are insufficiently brought into contact with one another and accordingly, electrical properties of the resulting transparent conductive film are apt to be impaired. If comparing two kinds of silver sols while assuming that the total amounts of silver are identical to one another, the amount of the silver sol having the higher silver solid content is smaller than that of the other silver sol having the lower solid content and therefore, the former is superior to the latter in view of storage and transportation. However, if the silver solid content exceeds 80% by weight, the storage stability of the resulting silver sol would conversely be reduced.

The contact between silver fine particles in the resulting transparent conductive film formed by applying the coating material for transparent conductive films is more improved in proportion to an increase in the packing density of the silver fine particles in the film and hence that of the sintered silver fine particles in the finally formed transparent conductive film and accordingly, the electrical properties of the film are considerably improved. If the packing density is less than 5 g/cm$^3$, the electrical properties of the transparent conductive film are sometimes insufficient. However, if it exceeds 8 g/cm$^3$, the electrical properties are not improved any more, the number of products which are off standards increases and this accordingly leads to an increase in cost. Therefore, the silver sol of the present invention preferably has a silver particle size distribution such that the packing density of the silver particles ranges from 5 to 8 g/cm$^3$.

The method for preparing a silver sol according to the present invention comprises the steps of reacting a solution of a silver compound with a reducing agent, for instance, a silver nitrate solution with a ferrous citrate solution, under the conditions required for suppressing any growth reaction of the silver particles formed during the reaction, i.e., at a temperature ranging from 5 to 50° C. and a stirring rate falling within the range of from 1,000 to 10,000 rpm to form silver fine particles, recovering the resulting silver fine particles using a centrifugal separator; and then dispersing the silver fine particles in a medium to give a silver sol having a silver solid content ranging from 1 to 80% by weight.

The silver compound used in the production method of the present invention is not restricted to specific ones insofar as they may be soluble in an appropriate solvent and can form silver particles through reduction with a reducing agent and specific examples thereof are silver nitrate, silver sulfate, silver chloride and silver oxide. In addition, the reducing agent usable in the method of the present invention may be any one capable of reducing such silver compounds and specific examples thereof include ferrous citrate, tannic acid, hydrazine hydrate and a solution of dextrin and sodium hydroxide.

Combinations of silver compound solutions with reducing agents as well as methods used for forming silver fine particles are as follows:

(1) A mixture (a solution A) of an aqueous sodium citrate solution and an aqueous ferrous sulfate solution is mixed with an aqueous solution of silver nitrate (a solution B).

(2) To a silver nitrate solution, there are added a fresh tannin solution and a dilute sodium carbonate solution. Alternatively, a sodium carbonate solution is first added to a silver nitrate solution and then a fresh tannin solution is added thereto.

(3) A dilute solution of hydrazine hydrate is dropwise added to a dilute aqueous solution of silver nitrate.

(4) Carbon monooxide is passed through a saturated silver oxide aqueous solution at ordinary temperature.

(5) A silver nitrate solution is added to an aqueous solution of dextrin and sodium hydroxide; or an aqueous silver nitrate solution is gradually added to an aqueous solution of dextrin and sodium hydroxide; or an aqueous silver nitrate solution is added to a mixture of a dextrin solution and a sodium hydroxide solution.

(6) A silver nitrate solution is mixed with a sodium hydroxide solution to form silver oxide, followed by washing, addition of a sodium carbonate solution and addition of a dilute solution of phosphorus in ether.

(7) To a silver-containing silver oxide solution, there are added a sodium carbonate solution, aqueous hydrogen peroxide and a silver sol reduced with phosphorus as a condensation nucleus; or to a silver-containing silver oxide solution, there are added a sodium carbonate solution, aqueous hydrogen peroxide and a gold sol reduced with phosphorus as a condensation nucleus.

(8) To a silver nitrate solution, there are added a sodium acetate solution and a pyrogallol solution.

(9) An aqueous sodium hydroxide solution is added to an aqueous silver nitrate solution to form silver oxide followed by passing hydrogen gas through a saturated silver oxide solution.

In the production method of the present invention, the growth rate of silver fine particles depends on the reaction temperature and stirring speed during the formation of silver fine particles from a solution of a silver compound. Regarding the reaction temperature, if it is less than 5° C., the reaction rate is extremely low and is not practically acceptable. On the other hand, if it exceeds 50° C., the growth rate of silver particles is high, the rate of the coarse particles formed becomes correspondingly high and thus it is difficult to obtain desired silver fine particles. In respect of the stirring speed, if it is less than 1,000 rpm, the growth rate of silver particles is high, the rate of the coarse particles formed becomes correspondingly high and thus it is difficult to obtain desired silver fine particles. On the other hand, the use of a stirring speed of higher than 10,000 rpm is not practical, since the flow of the reaction solution is detached from the stirring blade and the stirring effect is thus lowered.

In the production method of the present invention, the silver sol having a silver particle size distribution such that the packing density of silver particles falls within the range of from 5 to 8 g/cm$^3$ can be obtained according to the following method. As has been described above, the growth rate of silver fine particles depends on the reaction temperature and stirring speed during the formation of silver fine particles from a solution of a silver compound. Therefore, such a silver sol can be prepared by a method which comprises the steps of reacting a solution of a silver compound with a reducing agent at a temperature ranging from 5 to 50° C. and a stirring speed falling within the range of from 1,000 to 10,000 rpm, while the reaction temperature or the stirring speed is changed at least one time in the course of the reaction to thus form a mixture of silver fine particles having different particle sizes, recovering the resulting silver fine particles using a centrifugal separator; and then dispersing the silver fine particles in a medium.

Alternatively, a solution of a silver compound is reacted with a reducing agent at a temperature ranging from 5 to 50° C. and a stirring speed falling within the range of from 1,000 to 10,000 rpm, and then the fine particles thus formed are recovered using a centrifugal separator. Then these steps are successively repeated in the same batch or separate batches to form silver fine particles having different particle sizes, followed by mixing these silver fine particles having different particle sizes so that the packing density of the resulting mixture ranges from 5 to 8 g/cm$^3$; and dispersing the silver fine particles mixture in a medium.

Alternatively, the packing density of silver fine particles may likewise be controlled by classifying the silver particles by, for instance, further treating, in a centrifugal separator, the silver sol obtained by dispersing the silver particles in a medium after the separation through centrifugation, or filtering the silver sol through a membrane filter; again properly mixing these classified silver particles so as to have a desired particle size distribution.

The coating material for forming transparent conductive films according to the present invention can be prepared by diluting the foregoing silver sol to a silver solid content of 1 to 10% by weight. Alternatively, the silver sol per se may be used as the coating material if the sol has a silver solid content ranging from 1 to 10% by weight. Thus, the coating material comprises the silver sol in which the silver particle size ranges from 1 to 100 nm and a silver solid content of 1 to 10% by weight, which is excellent in storage stability and which has preferably a silver particle size distribution such that the packing density of silver particles ranges from 5 to 8 g/cm$^3$. The coating material may likewise comprise a binder in addition to the foregoing silver sol.

If the silver solid content in the coating material for forming transparent conductive films according to the present invention is less than 1% by weight, the contact between silver particles dispersed in a coated film (i.e., transparent conductive film) obtained from such a coating material is insufficient and the electrical properties of the resulting film are correspondingly apt to be impaired. On the other hand, if the silver solid content exceeds 10% by weight, the resulting coating material suffers from problems concerning handling properties and more specifically, it is difficult to obtain a film having a uniform thickness because of the agglomeration of silver particles during coating operations and/or the resulting film has an extremely large thickness.

The binder used in the coating material of the present invention herein means a film-forming component comprising a polymer or a monomer capable of forming a polymer through polymerization or crosslinking and may be organic or inorganic, or water-soluble or oil-soluble ones. The binders usable in the present invention are, for instance, acrylic binders such as acrylic resins, epoxy type binders, silicone type binders such as alkoxysilanes and chlorosilane and coupling agents such as titanate compounds.

The transparent conductive film of the present invention can be produced by applying the foregoing coating material for forming transparent conductive films onto the surface of a substrate such as a cathode-ray tube according to, for instance, a dip coating, spin coating or spray coating technique to give a film thereon and then firing and heating the film at a temperature on the order of about 100 to 200° C.

As has been discussed above in detail, the present invention permits the formation of a transparent conductive film on the surface of, for instance, a cathode-ray tube while reducing the production cost. The resulting transparent conductive film has high transparency suitably used for coating a cathode-ray tube, excellent conductivity, in particular, good electromagnetic shielding properties and a surface resistance of not more than $10^3$ Ω/□.

The present invention will hereinafter be described in more detail with reference to the following non-limitative working Examples and the effects practically attained by the present invention will also be discussed in detail in comparison with Comparative Examples.

EXAMPLE 1

To 350 cc of an aqueous sodium citrate solution having a concentration of 40% by weight, there was added 250 cc of a 30% by weight aqueous ferrous sulfate solution immediately after the preparation thereof. To the resulting mixed solution, there was added 250 cc of a 10% by weight aqueous silver nitrate solution, followed by maintaining the temperature of the reaction system at about 20° C. and reacting these ingredients with one another while maintaining the rotational speed of a stirring machine at 6,000 rpm to give a colloid solution of silver fine particles. The resulting silver fine particle-containing sol was found to have a silver solid content of not more than 0.1% by weight.

Then the silver sol was separated into a solid phase and a liquid phase (solution) by separation through sedimentation, followed by addition of a 0.4M sodium nitrate solution to the resulting solid phase to thus wash away iron-containing components. Thereafter, the solid phase was dehydrated in a centrifugal separator under a gravitational force of 3000 G to thus recover the silver-containing solid content (silver fine particles). The resulting silver-containing solid content was re-dispersed in a medium consisting of water to give a silver sol having a silver solid content of 3% by weight. The silver sol was quite dense and was colored black, but when the sol was diluted, it caused a change in color from black to wine red. The silver sol was inspected for its ζ-potential using an apparatus: "ELS" available from Otsuka Electronics Co., Ltd. and it was found to be in the negative region. The average particle size of the silver particles present in the silver sol was also determined and found to be 10 nm. It was confirmed that the silver fine particles carried citric acid molecules adsorbed thereon and was stabilized due to the protective action of the adsorbed citric acid molecules.

EXAMPLES 2 TO 5

The same procedures used in Example 1 were repeated except for using, as the medium in which the silver-containing solid content was dispersed, an ethyl alcohol/isopropyl alcohol/butyl alcohol (4:4:1) mixture (Example 2), a 99:1 mixture of an ethyl alcohol/isopropyl alcohol/butyl alcohol (4:4:1) mixture with acetyl acetone (Example 3), an isopropyl alcohol/2-isopropoxy ethanol (80:20) mixture (Example 4) or a water/methyl alcohol (85:15) mixture (Example 5), to thus give each corresponding silver sol.

EXAMPLE 6

The same procedures used in Example 1 were repeated except that the temperature was maintained at about 30° C. and that the rotational speed of the stirring machine was set at 2,000 rpm to give a silver sol. The average particle size of the silver particles present in the silver sol thus prepared was found to be 45 nm.

EXAMPLE 7

The same procedures used in Example 1 were repeated except that the temperature was maintained at about 10° C. and that the rotational speed of the stirring machine was set at 2,000 rpm to give a silver sol. The average particle size of the silver particles present in the silver sol thus prepared was found to be 5 nm.

EXAMPLE 8

The same procedures used in Example 1 were repeated except that the silver solid content was re-dispersed in a medium consisting of water in a silver solid content of 2% by weight to give a silver sol. The average particle size of the silver particles present in the silver sol thus prepared was found to be 10 nm.

COMPARATIVE EXAMPLE 1

The same procedures used in Example 1 were repeated except that the rotational speed of the stirring machine was set at 300 rpm to give a silver sol. The average particle size of the silver particles present in the silver sol thus prepared was found to be 120 nm.

EXAMPLES 9 TO 24

There were prepared a coating material for forming transparent conductive films which comprised each one of the silver sols prepared in Examples 1 to 8 and a coating material for forming transparent conductive films which comprised a mixture of each silver sol prepared in Example 1 to 8 and isopropyltriisoste aroyl titanate as a binder. These coating materials were each applied onto the surface of a cathode-ray tube according to the spin coating method to give a film thereon and then the film was fired and heated at 150° C. in air to thus form a transparent conductive film. Characteristic properties of the resulting transparent conductive films determined are summarized in the following Table. In the following Table, the "transparency" was expressed in terms of transmittance as determined at a wavelength ranging from 380 to 780 nm and the "strength" means the value determined after rubbing 40 times with an eraser.

TABLE

| Ex. No. | Silver Sol Source | Binder | Surface Resistance ($\Omega/\square$) | Thickness of film ($\mu$m) | Transparency (%) | Strength (N/m$^2$) |
| --- | --- | --- | --- | --- | --- | --- |
| 9 | Ex. 1 | not added | $5 \times 10^2$ | 0.05 | 95 | 25 |
| 10 | Ex. 1 | added | $6 \times 10^2$ | 0.05 | 95 | 30 |
| 11 | Ex. 2 | not added | $4 \times 10^2$ | 0.04 | 94 | 27 |
| 12 | Ex. 2 | added | $4 \times 10^2$ | 0.04 | 94 | 32 |
| 13 | Ex. 3 | not added | $4 \times 10^2$ | 0.04 | 93 | 26 |
| 14 | EX. 3 | added | $4 \times 10^2$ | 0.04 | 94 | 31 |
| 15 | Ex. 4 | not added | $4 \times 10^2$ | 0.04 | 94 | 28 |
| 16 | Ex. 4 | added | $4 \times 10^2$ | 0.04 | 93 | 32 |
| 17 | Ex. 5 | not added | $5 \times 10^2$ | 0.05 | 92 | 28 |
| 18 | Ex. 5 | added | $5 \times 10^2$ | 0.05 | 93 | 33 |
| 19 | Ex. 6 | not added | $6 \times 10^2$ | 0.05 | 93 | 28 |
| 20 | Ex. 6 | added | $6 \times 10^2$ | 0.05 | 92 | 30 |
| 21 | Ex. 7 | not added | $3 \times 10^2$ | 0.05 | 95 | 30 |
| 22 | Ex. 7 | added | $4 \times 10^2$ | 0.05 | 95 | 32 |
| 23 | Ex. 8 | not added | $4 \times 10^2$ | 0.05 | 95 | 31 |
| 24 | Ex. 8 | added | $4 \times 10^2$ | 0.05 | 94 | 32 |

EXAMPLES 25 TO 28 AND COMPARATIVE EXAMPLE 2

The same procedures used in Example 1 were repeated except for controlling the silver solid content after dispersion in a medium consisting of water to 10% by weight (Example 25), 30% by weight (Example 26), 50% by weight (Example 27), 70% by weight (Example 28) and 90% by weight (Comparative Example 2) to give each corresponding silver sol. The silver sols prepared in Examples 25 to 28 were found to have excellent storage stability. More specifically, they did not cause any agglomeration even after allowing to stand for one month. On the other hand, the silver sol of Comparative Example 2 was found to have poor storage stability since it caused phase separation due to agglomeration within a short period of time.

What is claimed is:

1. A method for preparing a silver sol, comprising the steps of reacting a solution of a silver compound with a reducing agent at a temperature ranging from 5 to 50° C. and a stirring speed falling within the range of from 1,000 to 10,000 rpm to form fine silver particles having a particle size ranging from 1 to 100 nm; recovering the resulting fine silver particles using a centrifugal separator; and then dispersing the fine silver particles in a medium to give a silver sol having a silver solid content ranging from 1 to 80% by weight.

2. The method for preparing a silver sol according to claim 1, wherein the silver sol has a silver particle size distribution such that the packing density of the silver particle ranges from 5 to 8 g/cm$^3$.

3. The method for preparing a silver sol according to claim 1, wherein the silver compound is silver nitrate and the reducing agent is a ferrous citrate.

4. The method for preparing a silver sol according to claim 2, wherein the silver compound is silver nitrate and the reducing agent is a ferrous citrate.

5. A method for preparing a silver sol, comprising the steps of reacting a solution of a silver compound with a reducing agent at a temperature ranging from 5 to 50° C. and a stirring speed falling within the range of from 1,000 to 10,000 rpm, while the reaction temperature or the stirring speed being changed at least one time in the course of the reaction to thus form a mixture of fine silver particles having different particle sizes, the mixture having a particle size distribution such that the packing density of the silver particles ranges from 5 to 8 g/cm$^3$, recovering the resulting fine silver particles using a centrifugal separator; and then dispersing the fine silver particles in a medium to give a silver sol having a silver solid content ranging from 1 to 80% by weight.

6. A method for preparing a silver sol, comprising the steps of reacting a solution of a silver compound with a reducing agent at a temperature ranging from 5 to 50° C. and a stirring speed falling within the range of from 1,000 to 10,000 rpm to form fine silver particles and then recovering the fine particles using a centrifugal separator, repeating these steps a sufficient number of times to obtain fine silver particles having different particle sizes; then mixing these fine silver particles having different particle sizes so that the packing density of the resulting mixture ranges from 5 to 8 g/cm$^3$; and dispersing the silver fine particle mixture in a medium to give a silver sol having a silver solid content ranging from 1 to 80% by weight.

* * * * *